United States Patent
Iwaki (12) 
(10) Patent No.: US 6,275,234 B1
(45) Date of Patent: *Aug. 14, 2001

(54) DISPLAY CONTROL SYSTEM AND METHOD FOR CONTROLLING DISPLAY OF THREE-DIMENSIONAL GRAPHICS DATA

(75) Inventor: Tsutomu Iwaki, Tokyo (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/044,014

(22) Filed: Mar. 19, 1998

(30) Foreign Application Priority Data

Mar. 27, 1997 (JP) .................................................. 9-075186

(51) Int. Cl.[7] ...................................................... G06T 17/00
(52) U.S. Cl. ............................ 345/428; 345/196; 345/127
(58) Field of Search ............................ 345/196, 502–503, 345/507, 509, 127, 428

(56) References Cited

U.S. PATENT DOCUMENTS

| | | |
|---|---|---|
| 5,392,393 | 2/1995 | Deering . |
| 5,402,513 | 3/1995 | Schafer . |
| 5,874,937 * | 2/1999 | Kesatoshi .............................. 345/127 |
| 6,002,446 * | 12/1999 | Eglit ...................................... 348/581 |
| 6,118,429 * | 9/2000 | Kasai et al. ........................... 345/132 |

* cited by examiner

Primary Examiner—Jeffery Brier
Assistant Examiner—Motilewa Good-Johnson
(74) Attorney, Agent, or Firm—Finnegan, Henderson, Farabow, Garrett & Dunner, L.L.P.

(57) ABSTRACT

A 3D data structure written to an off-screen area of a VRAM by a CPU is subjected to geometry conversion and rendering by a 3D graphics accelerator. The screen size of 3D screen data subjected to rendering is the same as the original size thereof, such as 640×480 dots. The 3D screen data is converted from a YUV format to an RGB format by a color space converter and sent to a scaler. In the scaler, the 3D screen data is interpolated, and its screen size is enlarged to that of a 3D window designated by a user in order to display 3D graphics.

15 Claims, 6 Drawing Sheets

DISPLAY CONTROL SYSTEM AND METHOD FOR CONTROLLING DISPLAY OF THREE-DIMENSIONAL GRAPHICS DATA

BACKGROUND OF THE INVENTION

This application is based on Japanese Patent Application No. 9-75186, filed Mar. 27, 1997, the contents of which is incorporated herein by reference.

The present invention relates to a display control system used in personal computers and the like and a method for controlling display of three-dimensional graphics data.

Conventionally, a three-dimensional graphics function has been carried out on a workstation mainly for use in engineering such as CAD and CAM. Recently, even in personal computers, the three-dimensional graphics function has been supported for daily use representing entertainment software such as games.

In order to implement a three-dimensional graphics function, generally, not all 3D (three-dimensional) processing (geometry conversion, rendering, etc.) for drawing three-dimensional graphics, is executed by a CPU, but hardware called a 3D graphics accelerator is employed in order to cover part of the 3D operations. If the 3D graphics accelerator is used, a load can be distributed by causing the CPU to execute geometry conversion using floating-point arithmetic and by causing the accelerator to execute rendering including texture mapping and Z buffering, with the result that the 3D graphics can be drawn at high speed.

In recent personal computers, a display screen is improved in resolution and a graphics subsystem, which supports high-resolution display of 800×600 dots or 1024× 768 dots, is the mainstream, whereas the size of a typical screen of 3D graphics is 640×480 dots. Thus, a problem poses that if 3D graphics are displayed on the high-resolution display screen, their display size is reduced in appearance.

If 3D graphics are drawn by setting their original screen to a large size of 800×600 dots or 1024×768 dots in advance, they can be displayed in full on the high-resolution display screen. If, however, the size of the original screen of the 3D graphics is set large in advance, all the 3D operations, such as geometry conversion and rendering necessary for drawing the 3D graphics, is increased in amount. This causes the load of the CPU and the power consumption of the 3D graphics accelerator to increase.

Personal computers are under restrictions on the performance of the CPU and the power consumption of the graphics subsystem and thus excessive processing cannot be executed by the CPU or the 3D graphics accelerator. For this reason, in personal computers, it is practically difficult to set the original screen size of the 3D graphics large before the drawing thereof.

As described above, the personal computers are under restrictions on the performance of the CPU and the power consumption of the graphics subsystem and thus the size of the original screen cannot be set large in advance in accordance with that of a screen on which 3D graphics are to be displayed. It is therefore difficult to display 3D graphics on a screen whose resolution is higher than that of the original screen.

BRIEF SUMMARY OF THE INVENTION

It is accordingly an object of the present invention to provide a display control system suitable for personal computers, wherein 3D graphics of high quality can be displayed by a screen size whose resolution is higher than that of the original screen size without setting the original screen size large before they are drawn, and a display control method for controlling display of the 3D graphics data.

In order to attain the above object, there is provided a display control system comprising: a memory for storing three-dimensional graphics data; three-dimensional acceleration means for executing three-dimensional operations including rendering processing for subjecting the three-dimensional graphics data stored in the memory to rendering, the three-dimensional acceleration means having scaling means for interpolating the three-dimensional graphics data subjected to the rendering by the rendering processing and enlarging a screen size of the three-dimensional graphics data subjected to the rendering; and a display monitor for displaying the three-dimensional graphics data obtained by the three-dimensional acceleration means.

In the display control system having the above constitution, three-dimensional graphics data having an original screen size of, e.g., 640×480 dots is written to a memory such as a video memory, and three-dimensional operations is executed with the original screen size unchanged. Of the three-dimensional operations including rendering and geometry conversion, a three-dimensional acceleration means serving as a three-dimensional graphics accelerator, executes the rendering such as shading, texture mapping and Z buffering to subject the three-dimensional graphics data to rendering. The screen size of the three-dimensional graphics data subjected to the rendering is the same as the original screen size. In the display control system of the present invention, the three-dimensional graphics data is input to the scaling means and undergoes scaling in order to increase in screen size and display it in full, though usually three-dimensional graphics data subjected to rendering is displayed on a screen as it is. If the scaling is executed for the three-dimensional graphics data after rendering, the screen size can be enlarged without increasing in amount of three-dimensional operations. Since the scaling is executed by interpolation, data of high quality can be displayed without distortion, unlike in a mere change in display magnification using a repetitive scan technique of repeatedly displaying the same raster data. According to the display control system of the present invention, therefore, three-graphics data of high quality can be displayed by a screen size the resolution of which is higher than the original screen size without setting the original screen size large before the three-dimensional graphics are drawn.

It is preferable that the display control system be provided with a color space conversion means for converting data of a YUV format to that of an RGB format. Thus, the color space of three-graphics data subjected to rendering or scaling can be changed from the YUV format to the RGB format which is usually used to display it on a display monitor.

It is also preferable that an on-screen area of the video memory be used to draw normal graphics data such as VGA and SVGA graphics data, an off-screen area thereof be used to execute the above three-dimensional operations for drawing three dimensional graphics data, and the video memory be used to draw both normal graphics data and three-dimensional graphics data. If, therefore, the memory space of the video memory is divided, the normal graphics data and three-dimensional graphics data can easily be synthesized and displayed. Since, furthermore, the off-screen area can be employed as a work area for executing three-dimensional operations by the three-dimensional acceleration means, the processing such as texture mapping requiring a relatively large memory size can be executed using a video memory without preparing a dedicated work memory.

In order to enhance display quality of the enlarged three-dimensional graphics, it is preferable to execute scaling by interpolation in both horizontal and vertical directions using horizontal and vertical scalers as the scaling means. If, however, vertical scaling involving interpolation is performed, an amount of processing for the scaling is increased. It is thus preferable that a first vertical scaling means for executing vertical scaling involving interpolation and a second vertical scaling means of a repetitive scan type for continuously outputting data on the same line be prepared as the vertical scaler and selectively used based on the relationship between the contents of scaling determined by a magnification and the like and the performance of the display system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 1:
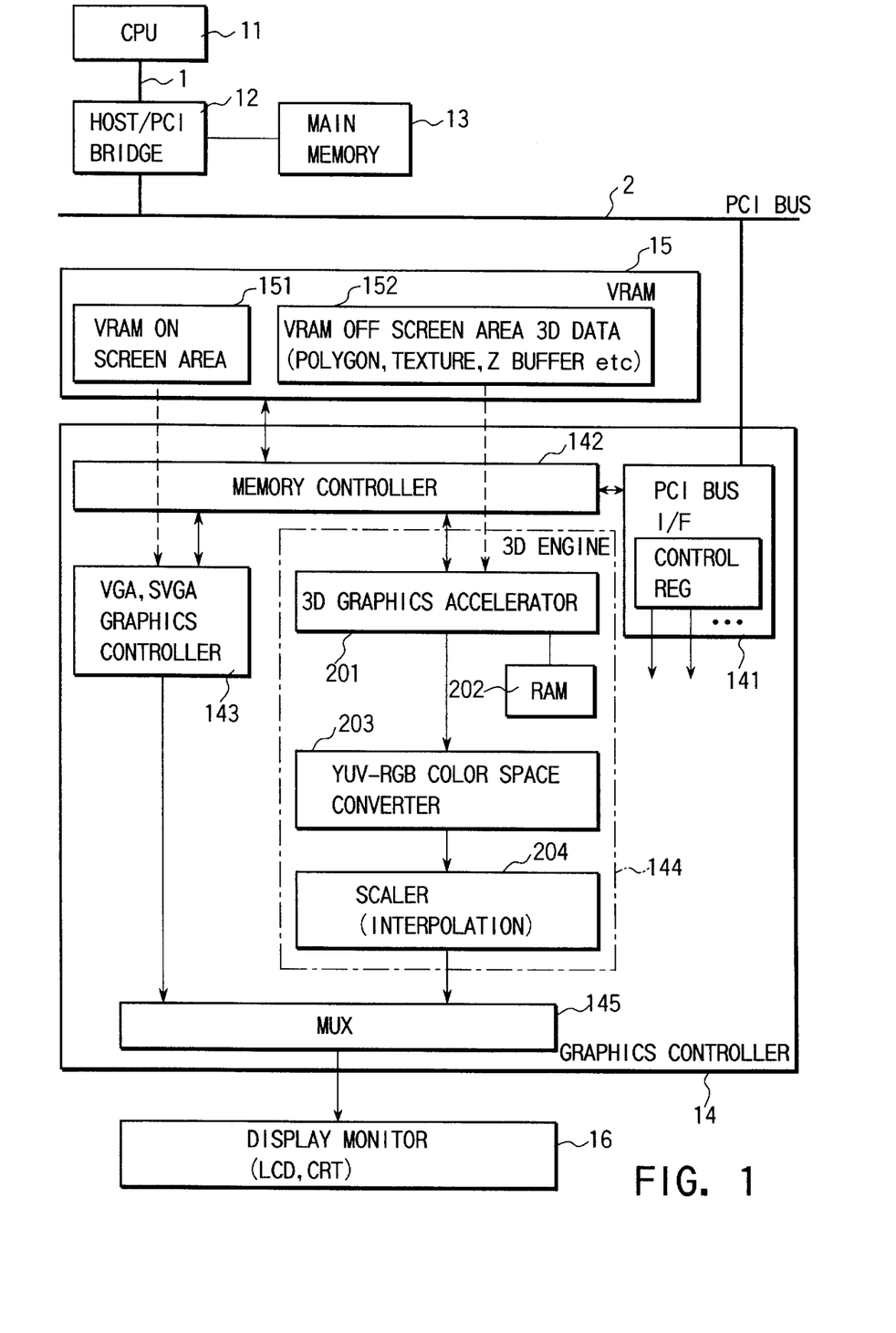
FIG. 1 is a block diagram illustrating a configuration of a computer system using a graphics controller according to an embodiment of the present invention.

FIG. 1 illustrates a system configuration of a personal computer using a graphics controller according to the embodiment of the present invention. The computer system has a processor bus 1, a PCI bus 2, a CPU 11, a host/PCI bridge 12, a main memory 13, a graphics controller 14 and a video memory (VRAM) 15 on its system board.

The CPU 11 is realized by, for example, the microprocessor "Pentium" manufactured and sold by Intel. The processor bus 1, which is directly connected to an I/O pin of the CPU 11, has a data bus of 64 bits in width. The main memory 13 is a memory device constituted of a plurality of DRAM modules and storing an operating system, various types of device drivers, application programs to be executed, processing data, etc.

The host/PCI bridge 12 is a bridge LSI connecting the processor bus 1 and PCI bus 2 and functioning as one of bus masters of the PCI bus 2. The bridge 12 also has a function of converting a bus cycle including data and addresses bidirectionally between the processor bus 1 and PCI bus 2 and that of controlling access to the memory 13 via the memory bus.

The PCI bus 2 is a clock synchronized type I/O bus, and all data transfer cycles on the PCI bus 2 are synchronized with a PCI bus clock. The maximum frequency of the PCI bus clock is 33 MHz. The PCI bus 2 has an address/data bus used time-divisionally. The address/data bus is 32 bits in width.

The data transfer cycles on the PCI bus 2 are formed of an address phase and at least one data phase subsequent thereto. In the address phase, an address and a transfer type are output, while in the data phase, 8-bit, 16-bit, 24-bit or 32-bit data is output.

Like the host/PCI bridge 12, the graphics controller 14 functions as one of bus masters of the PCI bus 2. This controller 14 causes image data of the VRAM 15 to be displayed on a display monitor 16 such as an LCD display and a CRT display, and supports a display function of VGA and SVGA and a 3D graphics accelerator function.

The graphics controller 14 is realized by a one-chip LSI including a PCI bus interface 141, a memory controller 142, a graphics display control circuit 143, a 3D graphics engine 144 and a multiplexer 145.

The PCI bus interface 141 issues and receives transaction through the PCI bus 2. The memory controller 142 reads/writes data from/to the VRAM 15 at the request of the graphics display control circuit 143, 3D graphics engine 144 and CPU 11.

The graphics display control circuit 143, which is a graphics controller for VGA and SVGA compatible with each other, converts graphics data, written to an on-screen area 151 of the VRAM 15 by the CPU 11, into RGB video data and outputs it. The graphics display control circuit 143 has a function of drawing two-dimensional data on the on-screen area 151.

The 3D graphics engine 144 is designed to execute 3D operations for drawing of 3D graphics using an off-screen area 152 of the VRAM 15 and, more specifically, it executes 3D operations for 3D graphics data (polygon data structure, texture, Z buffer) written to the off-screen area 152. The 3D graphics data is a 3D data structure generated using a drawing function such as OPEN GL of Silicon Graphics and Direct 3D of Microsoft Corporation, and its typical screen has the maximum size of 640×480 dots. As shown, the 3D graphics engine 144 includes a 3D graphics accelerator 201, a RAM 202, a color space (YUV-RGB) converter 203 and a scaler 204.

The 3D graphics engine 144 is designed to actually execute the above 3D operations for drawing the 3D graphics at high speed.

Generally, the 3D operations is roughly divided into a geometry conversion stage and a rendering stage. The geometry conversion stage is processing for forming an object called a polygon from vertex coordinates of an object determined by polygon data. This operations includes both coordinates conversion for deforming, rotating and enlarging/reducing the polygon itself and writing processing for computing an influence of light and shade generated on the polygon. The rendering is to produce displaying graphics (3D screen data) by actually coloring the object formed by the geometry conversion and setting a light source. This operations contain shading for putting shade to a wire frame of the polygon, texture mapping for sticking an image called a texture on the surface of the polygon, and Z buffering for hidden surface erasure for removing an invisible part of the object.

The 3D graphics accelerator 201 has a function of executing both geometry conversion and rendering; however, the geometry conversion necessitating floating-point arithmetic operation can be executed by the CPU 11 and only the rendering can be done by the 3D graphics accelerator 201. The size of the 3D screen data acquired by the 3D graphics accelerator 201 is the same as the original size of 3D graphics data which has been written to the off-screen area 152 of the VRAM 15 by the CPU 11 and has not undergone the 3D operations.

The RAM 202 is a memory provided on a chip of the graphics controller 14 in order to execute the 3D operations by the 3D graphics controller 201 at high speed. The 3D operations is usually executed using the off-screen area 152 of the VRAM 15 as a work area. If the RAM 202 is employed, shading or Z buffering for the rendering can be executed thereon without accessing to the VRAM 15.

The color space converter 203 converts 3D screen data of a YUV format of 4:2:2, 4:2:0 or 4:4:4 into that of an RGB format. The 3D screen data of the RGB format is input to the scaler 204.

The scaler 204 executes scaling for increasing the size of the 3D screen data, which has undergone rendering, to a screen size which is larger than the original size. This scaling is done using interpolation. The contents of the scaling to be executed by the scaler 204, i.e., magnifications in the horizontal and vertical directions and scaling algorithm are determined by parameter values set in a control register of the PCI bus interface 141 by the CPU 11.

The multiplexer 145 superimposes the 3D graphics obtained by the 3D graphics engine 144 upon those done by the graphics display control circuit 143, and the superimposed graphics are displayed on the display monitor 16.

Figure 2:
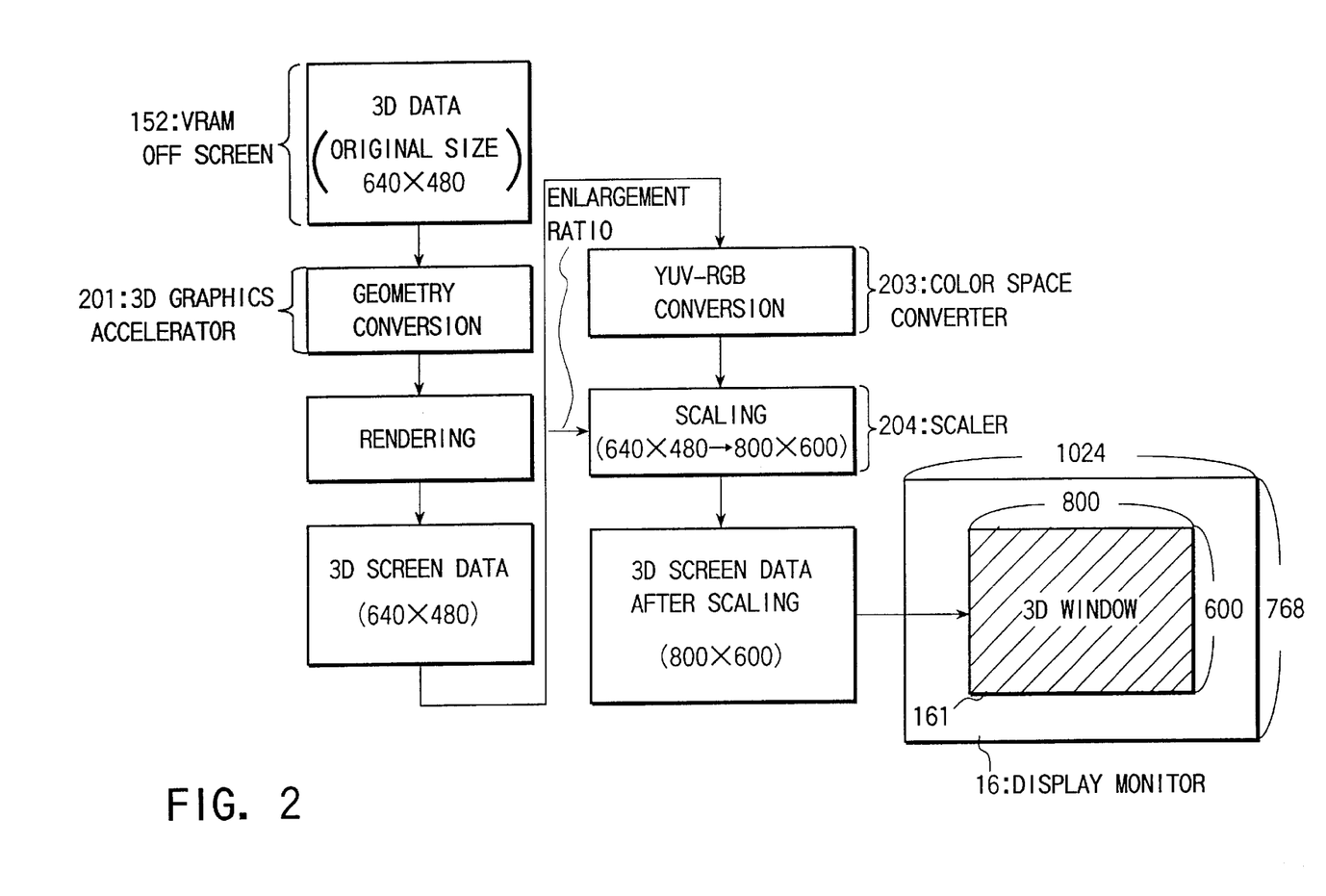
FIG. 2 is a view for explaining a procedure of 3D graphics processing executed by the graphics controller of the embodiment of the present invention.

A flow of the processing executed by the graphics controller 14 to display 3D graphics, will now be described with reference to FIG. 2.

First, the CPU 11 writes the foregoing 3D data structure in the off-screen area 152 of the VRAM 15. The 3D graphics accelerator 201 performs the geometry conversion and rendering process with respect to the 3D data. If the CPU 11 performs the geometry conversion, it writes the geometrically-converted data into the off-screen area 152, and the 3D graphics accelerator performs only the rendering process.

The screen size of 3D screen data acquired by the rendering is the same as the original size, e.g., 640×480 dots. The color space converter 203 converts the 3D screen data from the YUV format to the RGB format and sends the converted data to the scaler 204. The scaler 204 enlarges the screen size of 3D screen data to that of a 3D window 161 designated by a user in order to display 3D graphics. In the case of FIG. 2, the 3D window 161 of 800×600 dots is opened on the display screen of 1024×768 dots, and the scaler 204 enlarges the size of the 3D screen data from 640×480 dots to 800×600 dots.

As described above, the scaler 204 can perform the scaling process with respect to the 3D graphics data after the 3D graphics accelerator performs the rendering process. Therefore, the scaler 204 can increase the screen size without the increase of the 3D computation amount. Since the scaling is executed by interpolation and not by a mere change in display magnification by repetitive scan, the system of the present invention can display data of high quality without any distortion. Thus, the graphics controller 14 allows 3D graphics of high quality to be displayed by a screen size of higher resolution than that of the original size, without enlarging the original screen size of 3D graphics before drawing in advance.

Figure 3:
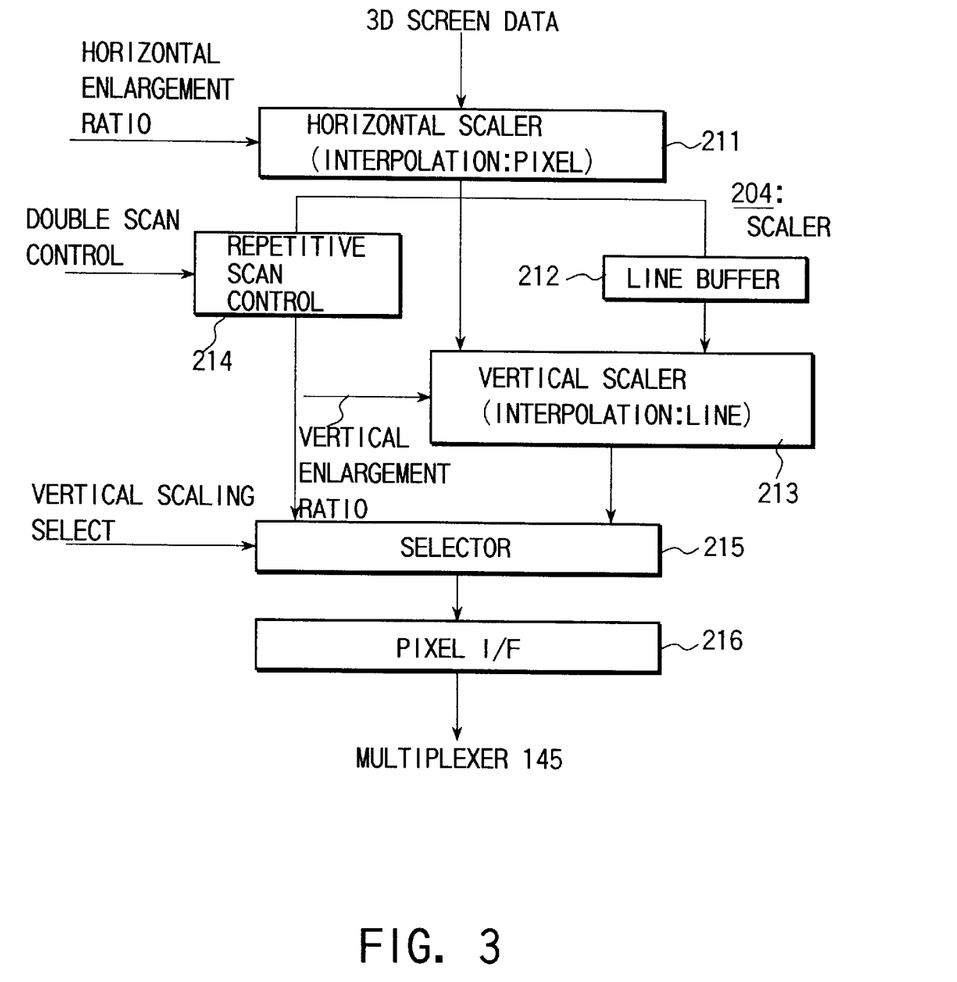
FIG. 3 is a block diagram specifically showing an example of a configuration of a scaler provided in the graphics controller of the embodiment of the present invention.

Referring to FIG. 3, an example of a configuration of the scaler 204 will now be described specifically.

The scaler 204 includes a horizontal scaler 211, a line buffer 212, a vertical scaler 213, a repetitive scan control circuit 214, a selector 215, and a pixel interface 216.

The horizontal scaler 211 generates a new pixel by interpolating pixels arranged continuously in the horizontal direction of 3D graphics data subjected to rendering, in accordance with parameter values representing a magnification in the horizontal direction set in a control register (not shown) by the CPU 11. Consequently, the 3D graphics data is enlarged in the horizontal direction for each display line. After enlarging the display line data in the horizontal direction, the horizontal scaler 211 stores the enlarged display line data in the line buffer 212 and supplies it to the vertical scaler 213 and repetitive scan control circuit 214.

The vertical scaler 213 generates new display line data by interpolating each of pixels on the same location between data of a predetermined line enlarged in the horizontal direction by the horizontal scaler 211 and display data of a line precedent thereto stored in the line buffer 212, in accordance with parameter values representing a magnification in the vertical direction set in a control register (not shown) by the CPU 11. The vertica scaler 213 therefore enlarges the 3D graphics data in the vertical direction.

The repetitive scan control circuit 214 continuously outputs the display data of the predetermined line enlarged in the horizontal direction by the horizontal scaler 211 and enlarges 3D graphics data in the vertical direction. The circuit 214 controls which line of display data is to be displayed and how many repetitions of the line display is to be performed in accordance with repetitive scan control parameter values set in a control register (not shown) by the CPU 11.

The selector 215 selects one of the vertical scaler 213 and repetitive scan control circuit 214 in accordance with parameter values (vertical scaling select) indicating a vertical scaling method set in a control register (not shown) by the CPU 11. The selected one is able to operate, while the other's operation is disabled. The pixel interface 216 is designed to supply the multiplexer 145 with data scaled in the horizontal and vertical directions.

As described above, the system of the present invention adopts an arrangement which permits the selective use of the vertical scaler 213 and repetitive scan control circuit 214. The scaler 213 is used when the magnification is relatively low, and it is switched to the repetitive scan control circuit 214 when the magnification becomes large. It is thus possible to execute scaling of highest quality within a range of display performance of the graphics controller 14.

The mechanism of determining the parameter values for controlling the scaler 204, will now be described with reference to FIG. 4.

Figure 4:
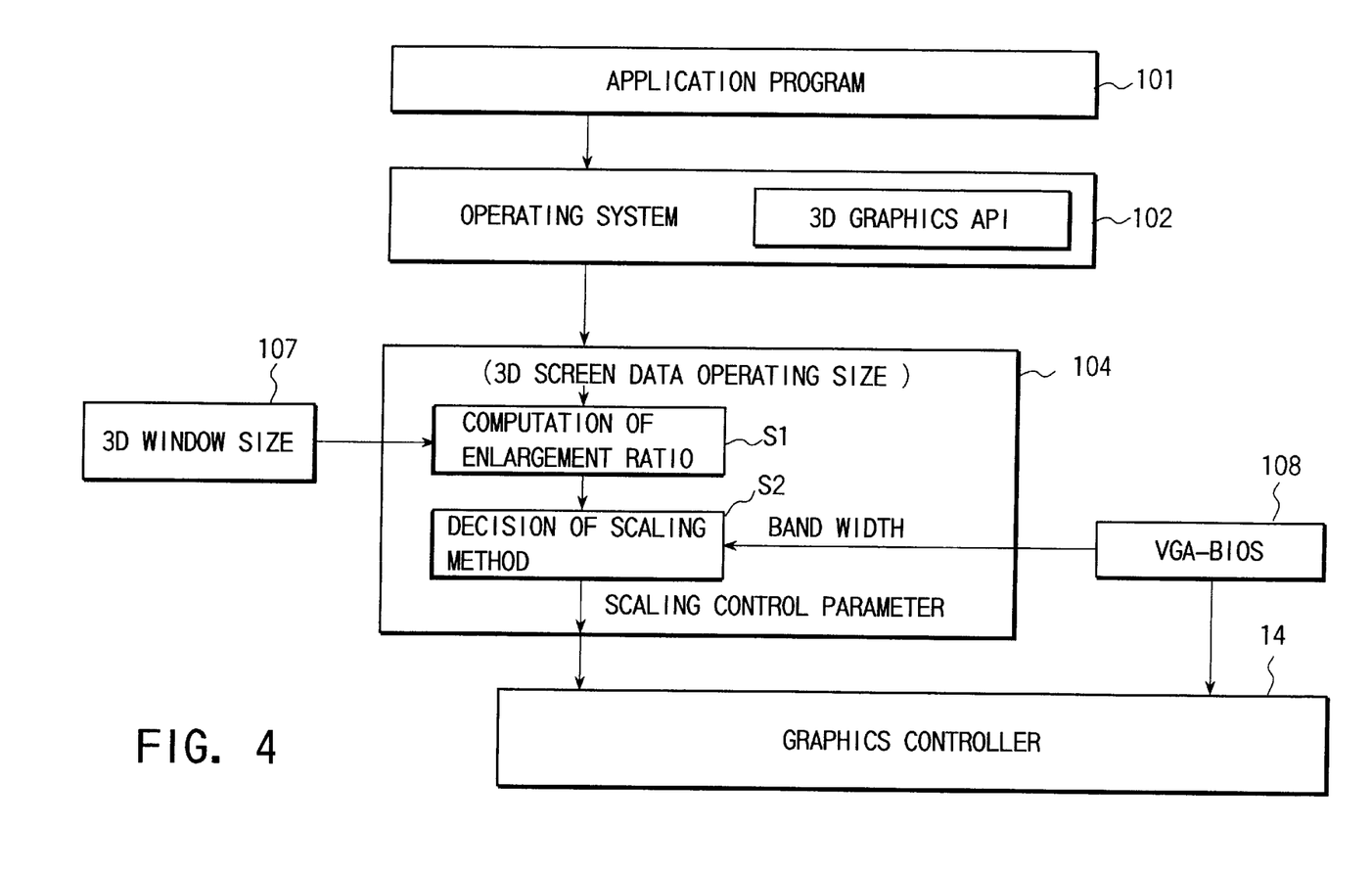
FIG. 4 is a view showing a structure of software for controlling the graphics controller of the embodiment of the present invention.

FIG. 4 illustrates a hierarchical structure of software for display control. A display driver 104 controls display of 3D graphics and VGA and SVGA graphics of the graphics controller 14 under control of an operating system 102 into which the foregoing 3D graphics drawing function is incorporated as an application interface (API).

Upon receiving a request of display of 3D graphics from the application program 101 or operating system 102, the display driver 104 acquires 3D window information 107 indicating the size of the 3D window 161 opened on the display screen, and calculates a magnification based on both the size of the 3D window and the original screen size of 3D data (step S1). Then, the display driver 104 obtains information about display performance such as scaling speed and memory bandwidth of the graphics controller 14 from a VGA BIOS 108, and determines a scaling method based on the information and magnification (step S2). Thus, the display driver 105 can supply the foregoing control parameter values to the scaler 204 for scaling control.

Figure 5:
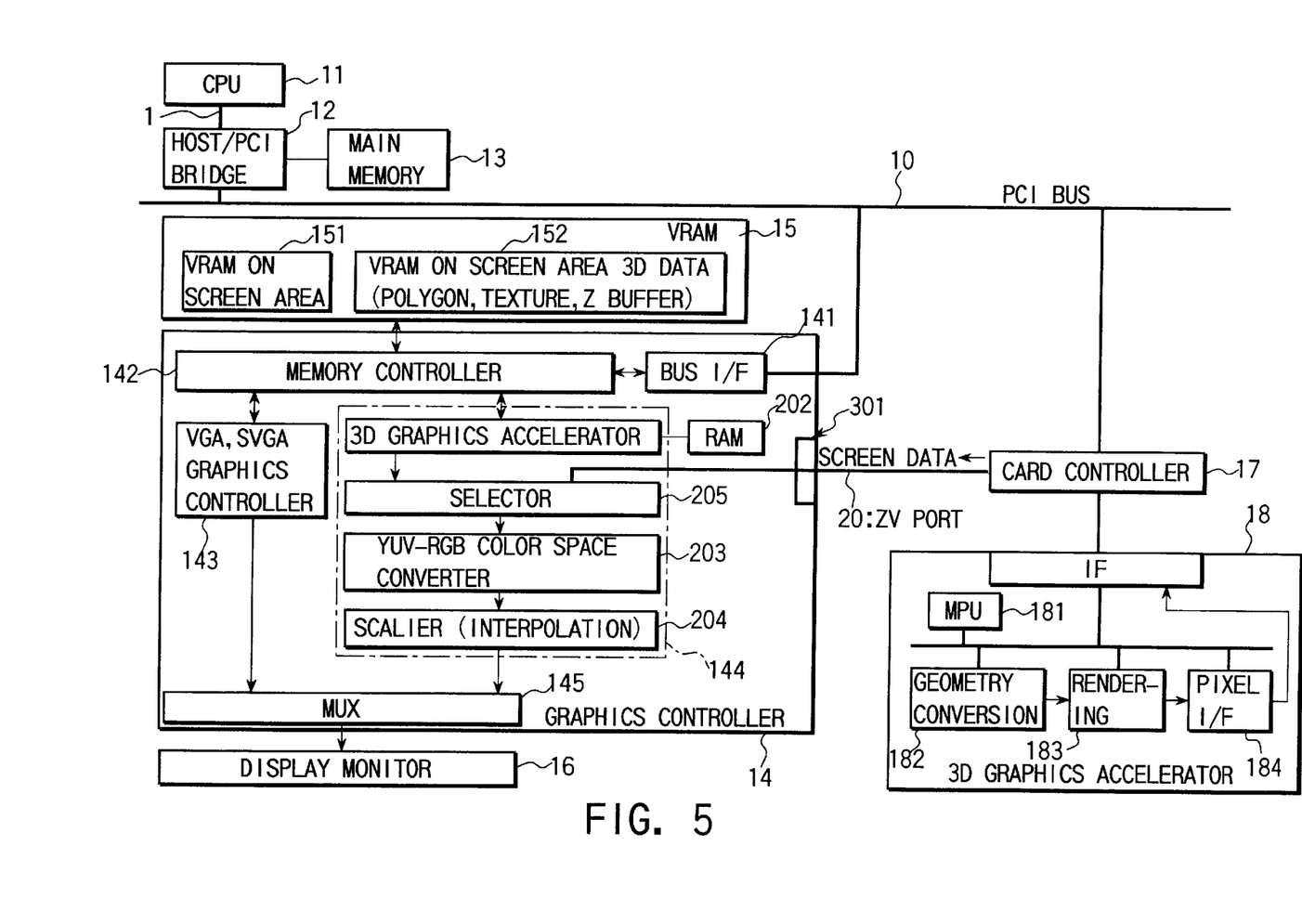
FIG. 5 is a block diagram illustrating another configuration of the graphics controller of the embodiment of the present invention.

FIG. 5 shows another configuration of the graphics controller 14. The graphics controller 14 includes a video input port 301 for receiving video data from outside, and the video data is overlaid on the VGA and SVGA graphics. The video input port 301 is supplied with 3D screen data, which is acquired by 3D operations using a 3D graphic accelerator card 18 constituted of a PC card, through a PC card controller 17 and a ZV port 20. The ZV port 20 is a video dedicated bus for directly connecting the PC card controller 17 (or PC card socket) and graphic controller 14 in point-to-point configuration.

A 3D engine 144 of the graphics controller 14 is provided with a selector 205 in addition to the 3D graphics accelerator 201, RAM 202, color space (YUV-RGB) converter 203 and scaler 204, as described with reference to FIG. 1. The selector 205 selects one of 3D screen data acquired by the 3D graphics accelerator 201 and 3D screen data input through the video port 301, and supplies the selected data to the color space converter 203. With this configuration, the size of the 3D screen data input through the video port 301 can be increased in accordance with that of the 3D window 161, as can be the size of the 3D screen data acquired by the 3D graphics accelerator 201.

As shown, the 3D graphics accelerator card 18 can be constituted of an MPU 181 for controlling a module in the card, a geometry conversion module 182, a rendering module 183, and a pixel interface 184 for supplying the 3D screen data to a ZV port 20.

In the foregoing embodiment, the scaling is performed after YUV-to-RGB conversion; however, it can be done before the conversion. The entire 3D engine 144 or some parts such as the 3D graphics accelerator 201 can be formed as an independent LSI chip other than the graphics controller 14.

Figure 6:
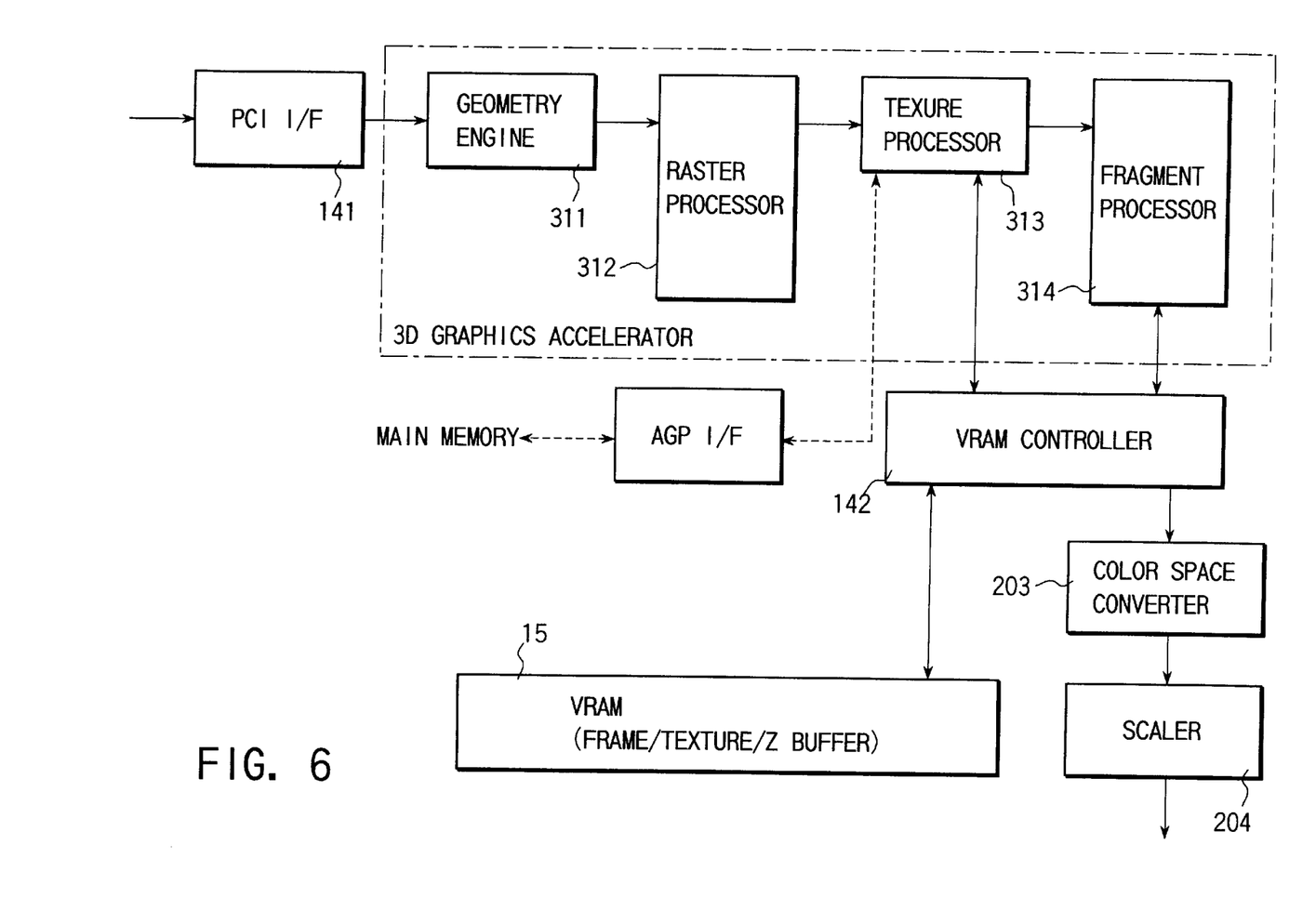
FIG. 6 is a block diagram specifically showing a configuration of a 3D graphics accelerator provided in the graphics controller of the embodiment of the present invention.

Referring to FIG. 6, a specific configuration of the 3D graphics accelerator 201 will now be described.

The 3D graphics accelerator 201 receives 3D graphics data from a main memory 13 to a geometry engine 311 through a PCI interface 141. The geometry engine 311 geometrically converts the received data. The geometrically-converted data is then converted into a polygonal mesh (wire frame) or the like by a raster processor 312. The wire frame is subjected to texture mapping by a texture processor 313 and fogging shading by a fragment processor 314 when the need arises. In the texture mapping and fogging shading, an off-screen area of the VRAM 15 is used as a work area. Since an amount of data of the texture used in the texture mapping is large, it can be stored in the main memory 13 and then read out therefrom via an AGP port.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display control system comprising:

a memory having a first area and a second area, said first area storing drawing data and said second area storing three-dimensional graphics data;

means for performing a rendering processing for subjecting the three-dimensional graphics data stored in said second area to rendering, and subsequently performing an interpolation processing of the three-dimensional graphics data to which rendering processing is performed, so as to enlarge a screen size of the three-dimensional graphics data; and means for multiplexing the three-dimensional graphics data and the drawing data to generate display data.

2. The display control system according to claim 1, wherein the three-dimensional graphics data subjected to the rendering by the rendering processing is data of a YUV format, and said three-dimensional acceleration means has color space conversion means for converting a color space of one of the three-dimensional graphics data subjected to the rendering by the rendering processing and three-dimensional graphics data scaled by said scaling means, from a YUV format to an RGB format used for display.

3. The system according to claim 1, further comprising:

said second area memory used as a work area for executing the rendering processing by said means for performing the rendering processing.

4. The system according to claim 1, further comprising:

means for receiving three-dimensional graphics data subjected to three-dimensional operations including rendering processing; and means for overlaying the three-dimensional graphics data received by said receiving means on the drawing data stored in said memory.

5. The display control system according to claim 1, wherein said means for performing the interpolation comprises;

horizontal scaling means for interpolating pixels arranged continuously in a horizontal direction of the three-dimensional graphics data subjected to the rendering and enlarging the three-dimensional graphics data in the horizontal direction for each of display lines arranged continuously in a vertical direction;

first vertical scaling means for interpolating data of the display lines enlarged in the horizontal direction by said horizontal scaling means and enlarging the three-dimensional graphics data in the vertical direction; and second vertical scaling means for continuously outputting data on a same display line such that the data on a predetermined display line enlarged in the horizontal direction by said horizontal scaling means is displayed continuously on a plurality of adjacent display lines on a display screen, and enlarging the three-dimensional graphics data in the vertical direction, and said system further comprises means for selecting said first vertical scaling means and said second vertical scaling means in accordance with predetermined conditions.

6. The display control system according to claim 5, further comprising:

means for calculating a magnification necessary for increasing an original screen size of the three-dimensional graphics data stored in said memory to a size of three-dimensional graphics window for displaying the three-dimensional graphics data on the display screen; and means for causing one of said first vertical scaling means and said second vertical scaling means to execute vertical scaling based on the magnification and performance of said display control system.

7. The display control system according to claim 5, further comprising a line buffer storing display data one line before a current line position;

wherein the first vertical scaling means generates new display line data by interpolating each of pixels on the same location between the three-dimensional graphics data enlarged in the horizontal direction by the horizontal scaling means and the display data stored in the line buffer in accordance with parameter values representing a magnification in the vertical direction; and the second vertical scaling means controls which line of display data is to be displayed and how many repetitions of the line display is to be performed in accordance with repetitive scan control parameter value.

8. A display control method comprising the steps of:

storing drawing data into a first area of a memory;

storing three-dimensional graphics data into a second area of memory;

reading out the drawing data stored in said first area;

executing rendering processing for subjecting the three-dimensional graphics data stored in said second area to rendering;

interpolating the three-dimensional graphics data subjected to rendering by the rendering processing so as to enlarge a screen size of the three-dimensional graphics data subjected to the rendering; and multiplexing the three-dimensional graphics data and the drawing data to generate display data.

9. The display control method according to claim 8, further comprising a step of preparing an internal memory used as a work area for executing the rendering processing by said three-dimensional accelerator.

10. A computer system comprising:

a memory having a first area and a second area, said first area storing drawing data and being used as a frame buffer and said second area storing three-dimensional graphics data;

means for reading out the drawing data stored in said first area;

means for executing rendering processing for subjecting the three-dimensional graphics data stored in said second area to rendering and subsequently performing an interpolation processing of the three-dimensional graphics data to which rendering processing is performed, so as to enlarge a screen size of the three-dimensional graphics data; and means for multiplexing the three-dimensional graphics data and the drawing data to generate display data; and means for displaying the display data.

11. The system according to claim 10, further comprising a display driver, which includes:

means for calculating, in response to a request for displaying three-dimensional graphics data, a magnification based on both the size of a three-dimensional window size and an original screen size of three dimensional data; and means for obtaining information about display performance including scaling speed and memory band width of the graphics controller from a basic input and output system and for selecting the vertical scaler or the repetitive scan controller based on the information and magnification.

12. The system according to claim 10, further comprising:

a horizontal scaler for interpolating pixels arranged continuously in a horizontal direction of the three-dimensional graphics data subjected to rendering and enlarging the three-dimensional graphics data in a horizontal direction for each of display lines arranged continuously in a vertical direction;

a line buffer storing display data on line before a current line position;

a vertical scaler generating new display line data by interpolating each of pixels an the same location between the three-dimensional graphics data enlarged in the horizontal direction by the horizontal scaler and the display data stored in the line buffer;

a repetitive scan controller continuously outputting the display data of the predetermined line enlarged in the horizontal direction by the horizontal scaler and enlarges the three-dimensional graphics data in trie vertical direction in accordance with parameters representing a line of display data to be subjected to repetitive display of line data and a number of repetitions;

a selector selecting one of the vertical scaler and the repetitive scan controller in accordance with parameter values indicating a vertical scaling method; and pixel interface outputting data scaled in the horizontal and the vertical directions.

13. The system according to claim 12, wherein the horizontal scaler enlarges the three-dimensional graphics data in a horizontal direction in accordance with a horizontal enlargement ratio; and the vertical scaler interpolates, in accordance with a vertical enlargement ratio, each of pixels on the same location between the three-dimensional graphics data enlarged in the horizontal direction by enlarging the three-dimensional graphics data in a horizontal direction for each of display lines arranged continuously in a vertical direction;

a line buffer storing display data on line before a current line position;

a vertical scaler generating new display line data by interpolating each of pixels on the same location between the three-dimensional graphics data enlarged in the horizontal direction by the horizontal scaler and the display data stored in the line buffer;

a repetitive scan controller continuously outputting the display data of the predetermined line enlarged in the horizontal direction by the horizontal scaler and enlarges the three-dimensional graphics data in the vertical direction in accordance with parameters representing a line of display data to be subjected to repetitive display of line data and a number of repetitions;

a selector selecting one of the vertical scaler and the repetitive scan controller in accordance with parameter values indicating a vertical scaling method; and pixel interface outputting data scaled in the horizontal and the vertical directions.

14. The system according to claim 10, further comprising color space converting means for converting a color space which is subjected to rendering by the rendering process, from a YUV format to an RGB format used for screen display.

15. A computer system comprising:
a video random access memory having an on-screen area storing graphics data and used as a frame buffer and an off-screen area storing three-dimensional graphics data and drawing data;
a graphics controller which reads out the drawing data, stored in said memory and performs image processing thereto;
three-dimensional acceleration means for executing three-dimensional operations including rendering processing for subjecting the three-dimensional graphics data stored in the off-screen area of the video random access memory to rendering, said three-dimensional acceleration means having scaling means for interpolating the three-dimensional graphics data subjected to the rendering by the rendering processing and enlarging a screen size of the three-dimensional graphics data subjected to the rendering;
a multiplexer which outputs one of the three-dimensional graphics data and the drawing data to display the three-dimensional graphics data and the drawing data to a display monitor; and
color space converting means for converting a color space which is subjected to rendering by the rendering process, from a YUV format to an RGB format used for screen display, wherein
the three-dimensional accelerator comprises:
a geometry engine performing a geometry conversion of the three-dimensional data;
a raster processor converting the geometrically converted data by the geometry engine into a polygon mesh (wire frame);
a texture processor executing a texture mapping process with respect to the wire frame converted by the raster processor; and
a fragment processor fogging and shading process witn respect to the three-dimensional graphics data subjected to the texture mapping process.

* * * * *